Oct. 23, 1934.    G. J. SPIER    1,978,173
CORN POPPER
Filed Feb. 6, 1933    2 Sheets-Sheet 1

Inventor
Gus John Spier.

Oct. 23, 1934.                G. J. SPIER                    1,978,173
                              CORN POPPER
                         Filed Feb. 6, 1933          2 Sheets—Sheet 2
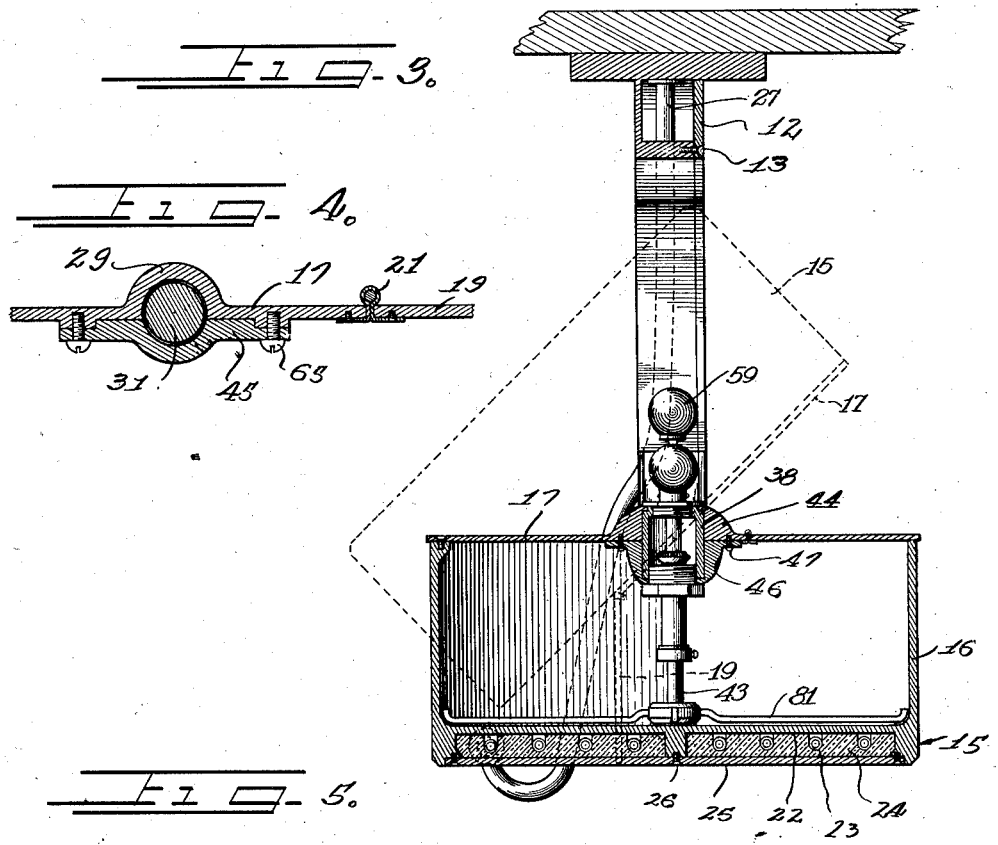
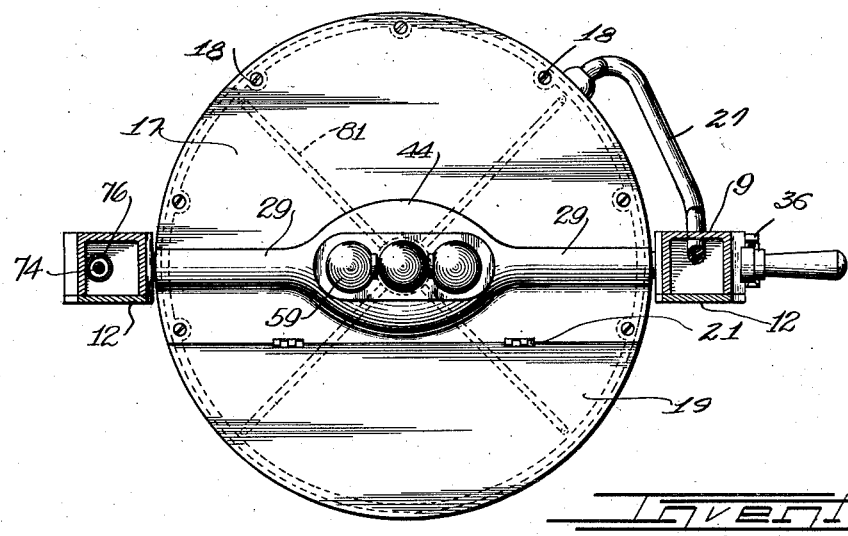
Inventor
Gus John Spier.
by
Attys.

Patented Oct. 23, 1934

1,978,173

UNITED STATES PATENT OFFICE 1,978,173

CORN POPPER

Gus J. Spier, Chicago, Ill.

Application February 6, 1933, Serial No. 655,298

12 Claims. (Cl. 53—4)

My invention relates to corn poppers and will be described as incorporated in a popper which is semi-automatic in operation.

An object of this invention is the provision of an improved corn popper, which is adapted to heat and pop the corn contained therein and adapted to automatically agitate the corn while being popped.

Another object of the invention is the provision of such a popper including means for pivotally mounting the popping kettle or container such that it may be charged with corn and thereafter dumped without stopping the operation of the agitating device.

Other objects and advantages of this invention will become apparent from the following detail description with reference to the accompanying drawings.

On the drawings:

Figure 3 is a vertical section taken on substantially the line III—III of Figure 1.

Figure 4 is a cross section similar to Figure 2 but taken on the line IV—IV of Figure 1.

Figure 5 is a horizontal section taken on the line V—V of Figure 1.

As shown on the drawings:

Figures 1, 2:
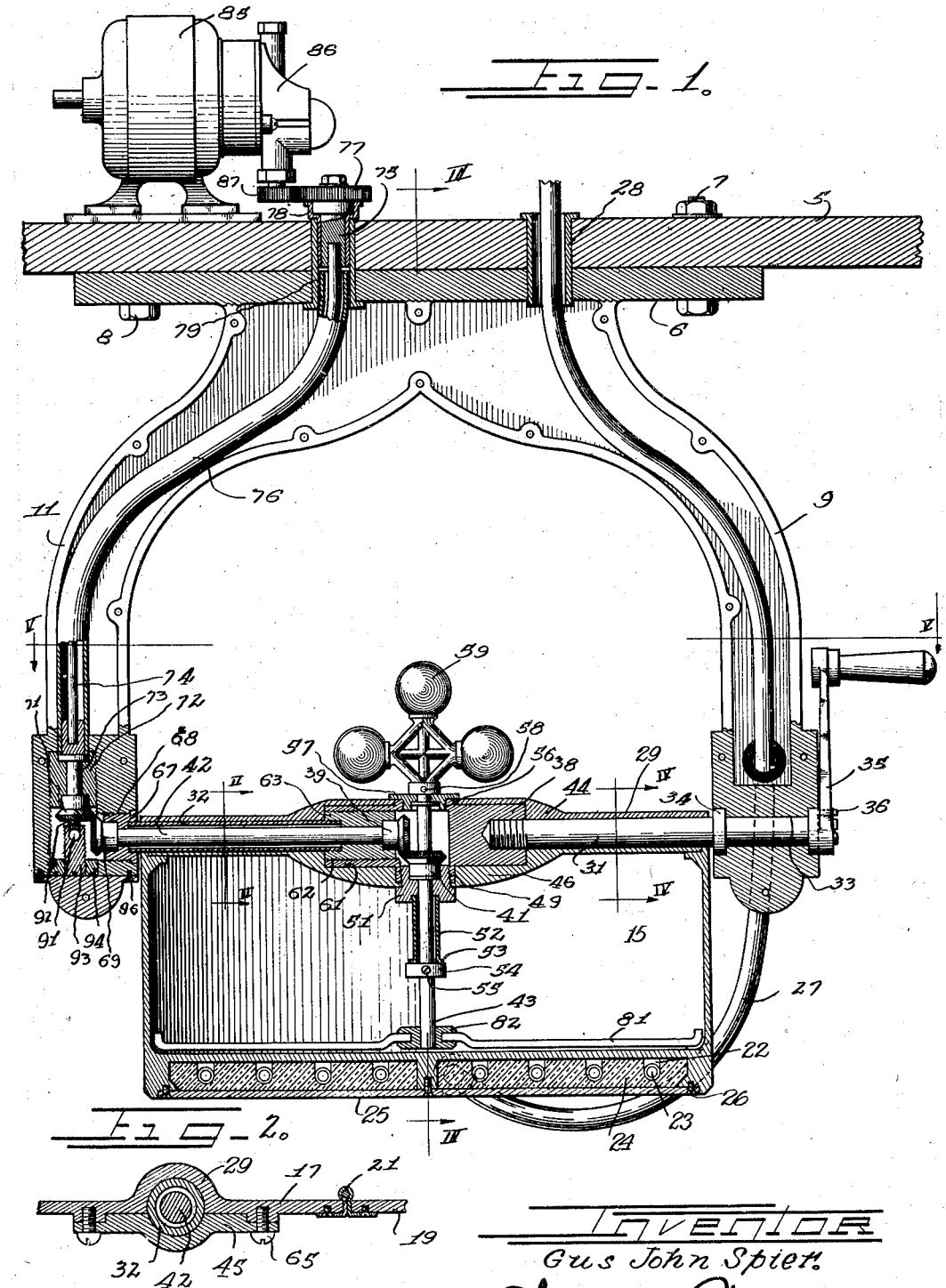
Figure 1 is a vertical section partly in elevation illustrating a corn popper incorporating my invention.
Figure 2 is an enlarged detail cross-section through a fragment of the popper and taken on the line II—II of Fig. 1.

The corn popper shown in the drawings for illustrating my invention comprises a base 5 having fixed thereto a support or bracket 6 by means of bolts 7 and 8. The support 6 comprises two depending and diverging hollow arms 9 and 11 normally provided with a cover plate 12 held in place by screws 13 as shown in Figure 3. A pop corn container 15 comprising a vertically extending side wall 16 has fixed to its upper edge a cover 17 by screws 18. One edge 19 of the cover is hingedly secured by hinges 21 to the main portion as shown in Figure 5. The container 15 is provided with apertures 22 in the bottom thereof in which are disposed electric heating elements 23 held in place and in spaced relation by a suitable refractory insulating material 24. The apertures 22 and the contents thereof are concealed by a bottom plate 25 held in place by screws 26. The electric heating elements are adapted to be heated by means of electricity which enters the same through a cable 27 extending from the bottom of the container to the interior of the hollow arm 9 and upwardly through the same, through a bushing 28 in the base 5 and to any source of electric power.

The cover 17 is provided with diametrically extending parti-cylindrical hollow portions 29 into which extend a shaft 31 and a hollow shaft 32 in alignment with the shaft 31. The outer end of the shaft 31 is journalled at 33 in the lower portion of the arm 9. The shaft 31 is provided with a collar 34 for limiting its axial movement. The extreme outer end of the shaft 31 is provided with a crank 35 for rotating the shaft 31 to the position shown in broken lines in Figure 3 for dumping the container when desired. A stop member 36 formed on the arm 9 is adapted to limit the rotary movement of the crank 35 to facilitate the dumping action and to prevent tilting of the container in the wrong direction. The inner end of the shaft 31 has threaded engagement in one end of a block 38 which block forms a gear housing for cooperating gears 39 and 41 on a power driven shaft 42 and an agitator shaft 43 respectively. The block 38 is held in place by an enlarged portion 44 on the cover 17 in cooperation with a bottom plate 45 having an enlarged portion 46. The portions 44 and 46 embrace the block 38 and are held together by screws 47 as shown in Figure 3. The block 38 is provided with a threaded opening 49 into which is threaded a bushing 51 in which is journalled the shank of the gear 41 and the agitator shaft 43. About the intermediate portion of the shaft 43 is disposed a sleeve 52 having threaded engagement with the bushing 51 and having on its lower end a flange 53 engaging the upper side of a collar 54 which collar is fixed to the shaft 43 by a set screw 55. This arrangement limits the vertical movement of the agitator with respect to the bushing 51 and consequently with respect to the container 15.

The block 38 is also provided with a threaded opening 56 into which is fitted a bushing 57 upon which is mounted a set of ornamental balls 59 secured for rotation to the upper end of the shaft 43 by a set screw 58.

One end 61 of the block 38 is provided with a threaded opening 62 into which is fitted a bushing 63 providing a bearing support for the shank of the gear 39 and for the inner end of the power driven shaft 42. The hollow shaft 32 has threaded engagement with the outer end of the bushing 63 and is held rigid with the cover 17 by the aid of the bottom clamping plate 45 secured in place by bolts 65, as shown in Figure 2. The plate 45 also underlies part of the shaft 31 and retains it in its parti-cylindrical portion 29. The outer end of the hollow shaft 32 is journalled in a bushing 67 having threaded engagement at 68 with the lower portion of the arm 11 of the bracket 6. The bushing 67 provides a bearing for the outer end of the shaft 42 and for the shank of the gear 69 disposed within the lower portion of the arm 11. The gear 69 has driving engagement with a gear 71 journalled in a bushing 72 and fixed to a stub shaft 73 which in turn has driving engagement with a flexible driving member 74 passing upwardly through the arm 11 within the casing 76, and having at its upper end, driving engagement with a stub shaft 75 fixed to a gear 77. The gear 77 is journalled in a bushing 78 which is fitted in the upper end of a bushing 79 passing through the upper portion of the bracket 6 and through the base 5.

For the purpose of driving the flexible member 74 and the shaft 42 which in turn drives the agitator shaft 43, and the agitating arm 81 radiating from the head 82 on the lower end of the agitator shaft 43, I have provided a suitable motor 85 driving through a suitable gear reduction mechanism 86 and a gear 87 which has driving engagement with the gear 77. The gear 71 on the lower end of the stub shaft 73 in the bushing 72 is adjustably held in position by a ball thrust bearing 91 engaging an extension 92 on the lower end of the shaft 73. The thrust bearing 91 is held in place by an adjustable bushing 93 supported by a reducer bushing 94 having threaded engagement with the lower end of the arm 11. A cap member 95 is fixed to the bottom of the arm 11 by set screws 96 which conceal the bushings 93 and 94 and prevent unauthorized adjustment of the same.

From the foregoing description it will be seen that I have provided an improved corn popper including an agitator disposed within the corn container, which agitator is adapted to be continuously driven regardless of the position of the container. Even though the container is inverted in the manner shown in Figure 3, the inverting movement of the container does not interfere with the continuous driving action of the agitator. It will be further appreciated that the mechanism necessary for accomplishing this result is very effectively and completely concealed from view, thereby providing a pleasing appearance. The ornamental balls 59 being fixed to the shaft 43, rotate during the rotary movement of the agitator and attract attention. The cable 27 leading from the heating element in the base of the container, extends upwardly through the hollow arm 9 and is thereby concealed from view except at the lower end where a small amount of slack is necessary to permit the rotary dumping action of the container.

It will be understood by those skilled in the art that my invention as herein described and illustrated is susceptible to various modifications without departing from the principle of my invention, and I desire that the patent to be granted hereon shall not be limited in any manner except as required by the prior art.

I claim as my invention:

1. In a corn popper, a container, said container comprising a side wall and a hollow bottom, electric heating means disposed in said hollow bottom, a cover for said container fixed to the upper edge of said side wall, said cover including a diametrically extending arched portion, a support for said container, pivot means journalled in said support and engaging said cover in said arched portion to permit pivotal movement of said container to invert the same.

2. In a corn popper, a container, a cover fixed to said container, said cover including a diametrically extending parti-cylindrical portion, agitating means in said container and power operated means extending through said parti-cylindrical portion and having operable engagement with said agitating means for actuating the same.

3. In a corn popper, a container, a cover fixed to said container, said cover including a diametrically extending parti-cylindrical portion, a support for said container, a hollow shaft rigidly fixed to said cover, extending through said parti-cylindrical portion and journalled in said support, agitating means disposed in said container, a power driven shaft extending through said hollow shaft and having operable connection with said agitating means to actuate the same.

4. In a corn popper, a container, a cover fixed to said container, said cover including a diametrically extending parti-cylindrical portion, a support for said container, a hollow shaft rigidly fixed to said cover extending through said parti-cylindrical portion and journalled in said support, agitating means disposed in said container, a power driven shaft extending through said hollow shaft and having operable connection with said agitating means to actuate the same, said support comprising a hollow bracket and flexible driving means extending through said hollow bracket and having driving connection with said power driven shaft.

5. In a corn popper, a container, a cover fixed to said container, said cover including a diametrically extending parti-cylindrical portion, a support for said container, a hollow shaft rigidly fixed to said cover extending through said parti-cylindrical portion and journalled in said support, agitating means disposed in said container, a power driven shaft extending through said hollow shaft and having operable connection with said agitating means to actuate the same, said container including a hollow bottom, an electric heating element in said hollow bottom, and an electric cable extending through said hollow bracket and having connection with said heating element.

6. In a corn popper, a container, a cover fixed to said container, said cover including a diametrically extending parti-cylindrical portion, a support for said container, a hollow shaft rigidly fixed to said cover extending through said parti-cylindrical portion and journalled in said support, agitating means disposed in said container, a power driven shaft extending through said hollow shaft and having operable connection with said agitating means to actuate the same, said container including a hollow bottom, an electric heating element in said hollow bottom, and an electric cable extending through said hollow bracket and having connection with said heating element, and a flexible driving member extending through said hollow bracket and having driving connection with said power driven shaft.

7. In a corn popper, a container, a cover fixed to said container, a plate fixed to the lower side of said cover and extending diametrically thereof, said plate and said cover having oppositely disposed complementary recesses together providing space for a gear housing, a gear housing disposed in the complementary recesses, agitating means in said container, and power driven means extending into said housing and operably connected with said agitator for actuating the same.

8. In a corn popper, a container, a cover fixed to said container, a plate fixed to the lower side of said cover and extending diametrically thereof, said plate and said cover having oppositely disposed complementary recesses together providing space for a gear housing, a gear housing disposed in the complementary recesses, a bracket for pivotally supporting said container, hollow journal means rotatably mounted in said bracket and being rigidly secured to said gear housing, agitating means in said container, and power driven means extending into said housing through said journal means and operably connected with said agitator for actuating the same.

9. In a corn popper, a container, agitating means in said container, a mounting bracket for said container, a diametrically extending supporting unit for said container having end portions pivotally mounted in said bracket, one end portion of said unit being hollow to the center of the container, and a power driven member extending from the bracket through the hollow portion of said unit and operably connected to said agitating means for actuating the same.

10. In a corn popper, a container, agitating means in said container, a mounting bracket for said container, a diametrically extending supporting unit for said container having end portions pivotally mounted in said bracket, one end portion of said unit being hollow to the center of the container, and a power driven member extending from the bracket through the hollow portion of said unit and operably connected to said agitating means for actuating the same, the opposite end of said unit having a rigid connection with the container and extending entirely through a portion of the bracket, and manually operable means secured to the extending end of said unit whereby the container may be inverted for dumping its contents therefrom.

11. In a corn popper, a pop corn container, a cover fixed to said container, a supporting bracket comprising two arms spanning said container, a centrally disposed block fixed to said cover, a plate cooperating with said cover to secure said block to said cover, said cover and plate having complementary recesses to encompass said block, and two aligned pivoting members having their outer end portions journalled in said bracket and their inner ends rigidly secured to said block to permit the container to be inverted.

12. In a corn popper, a pop corn container, a cover for said container, a supporting bracket comprising two arms spanning said container, a centrally disposed hollow block fixed to said cover, two aligned pivoting members having their outer end portions journalled in said bracket and their inner ends rigidly secured to said block to permit the container to be inverted, one of said pivoting members being hollow, a motor driven shaft extending through said hollow member and into said block, and agitating means in said container having operable connection within said block with said motor driven shaft.

GUS J. SPIER.